US007086062B1

United States Patent
Faour et al.

(10) Patent No.: US 7,086,062 B1
(45) Date of Patent: Aug. 1, 2006

(54) SYSTEM AND METHOD FOR HANDLING A UNIT OF WORK

(75) Inventors: Carolyn Faour, Austin, TX (US); Paul Anderson, Austin, TX (US); Avi Bedi, Austin, TX (US)

(73) Assignee: i2 Technologies US, Inc., Dallas, TX (US)

( * ) Notice: Subject to any disclaimer, the term of this patent is extended or adjusted under 35 U.S.C. 154(b) by 976 days.

(21) Appl. No.: 09/686,447

(22) Filed: Oct. 10, 2000

Related U.S. Application Data

(60) Provisional application No. 60/158,729, filed on Oct. 11, 1999.

(51) Int. Cl.
*G06F 9/46* (2006.01)
(52) U.S. Cl. ............... 718/106; 718/100; 718/102
(58) Field of Classification Search ............ 709/100, 709/101, 102; 718/100–104, 106
See application file for complete search history.

(56) References Cited

U.S. PATENT DOCUMENTS

| 5,481,707 | A | * | 1/1996 | Murphy et al. ............. 718/102 |
| 5,799,297 | A | * | 8/1998 | Goodridge et al. ........... 707/1 |
| 5,802,253 | A | * | 9/1998 | Gross et al. ................ 706/47 |
| 6,026,500 | A | * | 2/2000 | Topff et al. ................. 714/26 |
| 6,636,242 | B1 | * | 10/2003 | Bowman-Amuah ......... 715/764 |

OTHER PUBLICATIONS

Erich Gamma, et al., "Design Patterns—Elements of Reusable Object-Oriented Software," an imprint of Addison Wesley Longman, Inc., 2-pages at beginning of book, Copyright 1995.
Erich Gamma, et al., "Contents," "Preface," "Foreward," "Guide to Readers," and "Introduction," Design Patterns—Elements of Reusable Object-Oriented Software, an imprint of Addison Wesley Longman, Inc., 38 pages, Copyright 1995.
Erich Gamma, et al., "Composite—Object Structural," Design Patterns—Elements of Reusable Object-Oriented Software, an imprint of Addison Wesley Longman, Inc., Chapter 4, 11 pages, Copyright 1995.
Erich Gamma, et al., "Command—Object Behavior," Design Patterns—Elements of Reusable Object-Oriented Software, an imprint of Addison Wesley Longman, Inc., Chapter 5, 10 pages, Copyright 1995.

* cited by examiner

*Primary Examiner*—Meng-Al T. An
*Assistant Examiner*—Syed J Ali
(74) *Attorney, Agent, or Firm*—Brian E. Harris; James E. Walton

(57) ABSTRACT

A system and method for handling work items creates a work item object for each work item entered into the system. Each object maintains information regarding its state, and its type. Work items are maintained in queues, and each work item contains information identifying the queue it is in. Business processes, which may be controlled by people or automated modules, take items from queues, and perform actions on them. Actions modify the state of an item, and can alter its data. An item persists until the work it represents is completed.

30 Claims, 1 Drawing Sheet

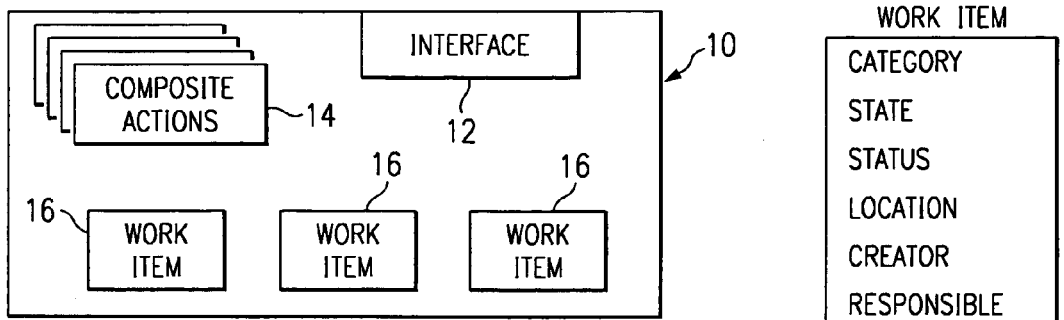
FIG. 1
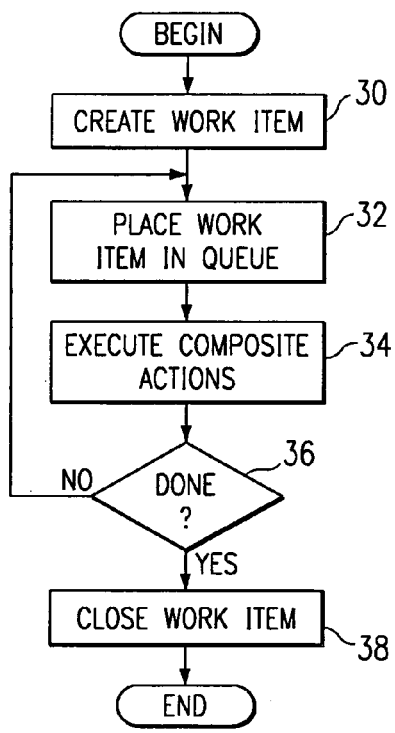
FIG. 2
FIG. 4
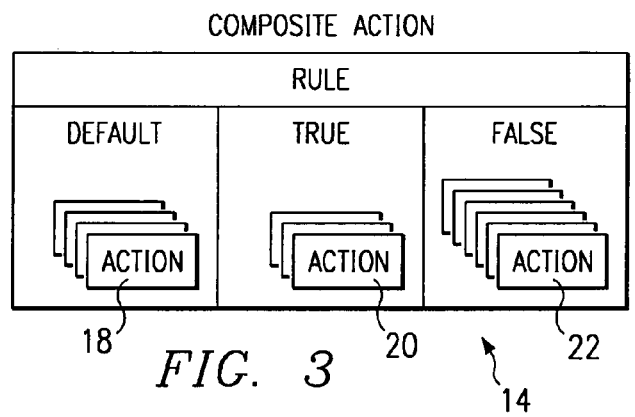
FIG. 3
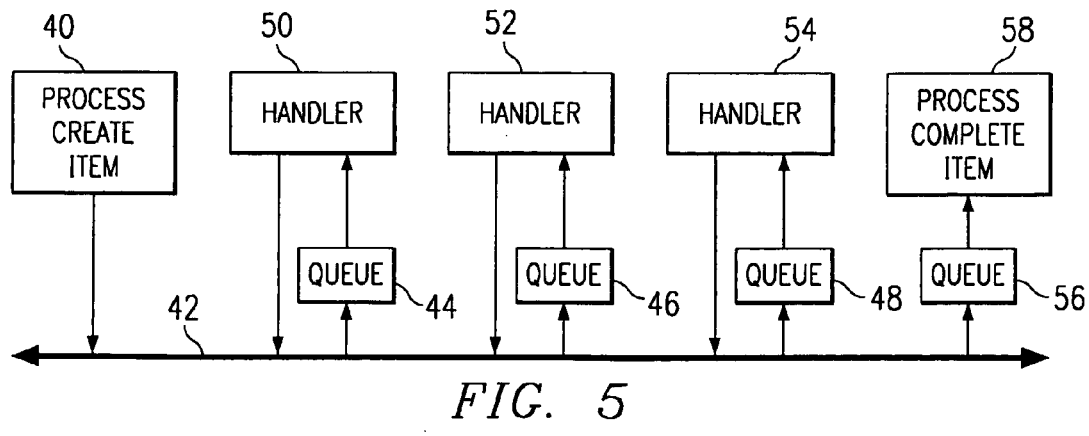
FIG. 5

SYSTEM AND METHOD FOR HANDLING A UNIT OF WORK

CROSS REFERENCE TO RELATED APPLICATION

The present application claims the benefit of priority of U.S. Provisional application No. 60/158,729, filed Oct. 11, 1999, titled COMMON FRAMEWORK FOR SYSTEMS THAT MANAGE A UNIT OF WORK THROUGH ITS LIFE CYCLE.

BACKGROUND OF THE INVENTION

1. Field of the Invention

The present invention relates generally to computer systems, and more specifically to a system and method for handling a work item within the system during that item's lifetime.

2. Description of the Prior Art

Numerous techniques are used to manage work that is to be performed. How that work is handled depends in part upon the nature of the work. In some applications, a single work item is worked upon by several different entities, human or automated systems, at different times. Work of this type is difficult for existing system to deal with, because keeping up with the work item and its status is not provided for.

An example of such a system would be one associated with a "help desk", in which requests for assistance are submitted by users, and addressed at various times by technicians. When a user submits a request for assistance, that request must be tracked as it passes through the system set up to deal with it. Such a request may be dealt with by a single technician, or it may be routed to one or more specialists for additional assistance. Such requests are sometimes referred to as "trouble tickets" in some industries. The trouble ticket must be maintained, and its status ascertained, until a response to the request is completed.

Most computer systems have trouble gracefully handling this type of work item. In many cases, dedicated code must be written to enable these items to be tracked and handled. This is inefficient, because systems that deal with such work items have many features in common.

It would be desirable to provide a system that enabled work items of this type to be easily handled. It would further be desirable for such a system to be generic enough that the numerous different business systems could use a single support system.

SUMMARY OF THE INVENTION

In accordance with the present invention, a system and method for handling work items creates a work item object for each work item entered into the system. Each object maintains information regarding its state, and its type. Work items are maintained in queues, and each work item contains information identifying the queue it is in. Business processes, which may be controlled by people or automated modules, take items from queues, and perform actions on them. Actions modify the state of an item, and can alter its data. An item persists until the work it represents is completed.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram illustrating a preferred common workflow domain;

FIG. 2 is a table identifying the contents of a preferred work item;

FIG. 3 is a diagram depicting a preferred composite action;

FIG. 4 is a flowchart outlining a process for handling work items; and

FIG. 5 is a block diagram illustrating data flows in a preferred embodiment of the present invention.

DESCRIPTION OF THE PREFERRED EMBODIMENT

As will be appreciated by those skilled in the art, the detailed implementation of the preferred embodiment can be made in numerous ways. Preferably, an object oriented environment is used, as it easily represents the various objects and methods described below. However, the described system and method can be used with systems of various types.

The following discussion can be better understood with reference to an example. The invention is not limited to a system implementing the described example, but it is used for explanatory purposes only.

In a business that assists users with questions regarding products they have purchased, some technique is needed to track the status of numerous inquiries. One approach is to provide a "trouble ticket," a document that is passed around containing the history of resolving the help request, and other information relevant to the request. This can be conceptualized as a physical document, a piece of paper, but is implemented as objects in a computer system domain.

The trouble ticket, referred to herein generically as a "work item," is preferably an object in an object oriented computer system. A new work item is created when a help request is first made, and exists until the request is completely resolved. The work item can change state, be passed to various personnel at various locations for handling, and can be modified at various stages. In addition, actions can be performed at various stages along the way that are not related to modifying the work item itself.

As an example, a user can contact a help line via a web page accessed over the Internet. The user selects a category of problem being encountered, such as a hardware problem with a certain brand of laser printer. A description of the problem can be entered by a simple text description, or as a series of responses to questions posed. When the user has entered the required information, including identification of the user, a work item is generated that must be routed to technical support and responded to.

The work item can be placed into a queue for technical support for that particular hardware. Eventually a technician takes the work item from the queue, and determines whether the problem can be answered based on the information given. If not, additional handling may be required, or the technician may need to call or otherwise contact the customer for further information. The work item may need to be routed between several different people, even several different companies, before it is resolved. Once the problem has been solved, which can include on-site repair or replacement, the work item is completed and archived.

The preferred system handles the work item and its routing in a manner that is generic and can be used for numerous different business processes. Implemented as a software system running on a computer system, FIG. 1 illustrates a preferred domain for the system. Domain 10 allows access through interface 12, which is the published set of methods by which the domain can be accessed. Contained within the domain are a number of composite actions 16, described below, and work items 16. Numerous other support and other modules and objects are included in domain 10 as known in the art, but the composite actions 14 and work items 16 are of primary conceptual interest. All access to the work items 16 is through the defined interface 12.

FIG. 2 describes the parts of a work item 16. Each work item 16 has a Category, which is used to determine, in part, how the work item 16 is handled. Each work item 16 has a State, which indicates where the work item 16 is in the business process flow. Typical states could include new, pending, awaiting follow up, completed, and so forth. A State indicates whether the work item 16 is open or closed. An open item has been locked by a handler process, and work is being done on it. A closed item is waiting in a queue for work to be performed.

Each work item 16 has a Location. All work items must be located in a queue, and the location identifies the queue the work item 16 is in. The Creator and Responsible fields indicate who created the work item 16, and who is responsible for dealing with it. The Responsible field can change during the course of handling the work item. The Due field, which may not be used in some cases, indicates when the problem represented by the work item must be resolved. This information can be used to, among other things, prioritize work items in a queue.

The History field contains a history of all actions that have been undertaken on this work item 16. Each time the item is amended in any way, or moved to a different queue, the history field is updated. By reviewing the History entry at any time, the complete sequence of events relating to this work item 16 can be recreated. The Description field includes a definition of the problem represented by the work item, and can include text and coded indicators.

FIG. 3 shows a composite action 14. Each composite action 14 contains a rule, which is a Boolean expression that gives an answer of True or False. The rule can be omitted. By linking a series of composite actions together in sequence, nearly any business process can be defined by using composite actions 14.

Three sets of actions are provided. A first set 18 is executed by default when the composite action has no rule, or when the rule is not evaluated because of a setting. A second set of actions 20 is executed when the Rule evaluates to True, and a third set of actions 22 is evaluated when the rule evaluates to False. These actions are any which can be executed by the system. Typical actions include sending the work item to a particular queue, sending e-mail or fax messages to the customer or a technician, and similar types of notifications. The actions can be more complex, and initiate various actions to be performed by the system. For example, an action could include access to a database of expert knowledge about a certain problem, followed by display of suggested solutions to a technician.

In the preferred embodiment, each Rule has three possible outcomes. If desired, other outcomes can be accommodated, with multi-way logical branching occurring. Each outcome of the rule evaluation can have a separate set of actions to be executed, in the manner described above.

FIG. 4 is a flowchart illustrating the preferred system in action. Initially, a work item 16 is created 30; a trouble ticket in the help desk example described herein. When a work item 16 is created, it is assigned a category. Categories are preferably arranged hierarchically, so that a user can better define the problem by selecting a lower category. In the previous example of a printer hardware problem, high level categories can include, for example, hardware and software problems, with lower levels defining with more precision the type of hardware having the problem and the nature of the problem itself.

Each category has an associated composite action 14. When a work item 16 is initially created, the composite action for the associated category is executed on the work item 16. Actions may include, for example, an e-mail notification that the work item 16 has been entered, and an estimate of the delay before it will be handled. The work item 16 must be initially placed into a queue, so each possible set of actions for the composite action associated with a category must have an action that places the work item 16 into a queue 32.

At some future time, the work item 16 is extracted from the queue. This can be done by an application executing automatically, or by a person calling up the work item 16 through an application operating on her computer. When a work item 16 is opened, it must be locked so that another application cannot access it. A composite action is executed on the work item 34, as described above.

The composite action can be executed by a technician after reviewing the work item 16. For example, after a technician opens a work item 16 relating to a hardware problem with a printer, the technician will take an initial step toward resolving the problem. In some cases, it may only be necessary to send a prepared reply to the customer explaining how to deal with a known, common problem. In others, it may be necessary to initiate a more complicated series of actions to resolve the problem. For example, it may be that the symptoms, although appearing to be hardware related, are actually caused by software. The technician may then need to transfer the work item 16 to a different queue for processing, and send a notification to the customer that this has happened.

The technician accomplishes activities such as this by selecting an appropriate action from a menu or other presentation on her computer display. The selected action then calls the corresponding composite action, which in turn executes the actions according to the result of its rule. As mentioned previously, these actions can include modifying the work item 16, moving it to a different queue, sending notifications, and so forth. Whenever a composite action is executed, the work item history is updated to reflect all changes.

If the result of the composite action is to change the work item status to complete 36, the work item 16 is closed 38 and archived. If processing of the work item 16 is not yet complete it is placed in a queue for future processing.

The result of a composite action may be to leave the work item 16 in the same queue for future handling, or to move it to a different queue. In either case, processing of the work item 16 is similar. Also, an action in a composite action may be to execute another composite action. This would result in a sequence of two or more composite actions being executed on the work item 16 with no additional input from a technician or the customer. By defining the composite actions, a complex workflow can be performed on the work item 16 in step 34. Generally, eventually the work item 16 is placed in a queue to await an action or decision to be performed by a person, but this is not a requirement.

FIG. 5 illustrates a conceptual data flow that can occur in the system described above. A work item 16 is initially created by an appropriate process 40 as described above. Transport of work items 16 within the common workflow domain is represented by line 42. The work item 16 is placed into one of queues 44, 46, 48. Eventually, it will be picked up by the associated handler 50, 52, 54, respectively, and operated upon. Operations by a handler 50–54 include the execution of one or more composite actions. At the end of such execution, the work item 16 is placed into another queue for further processing. As described above, in many cases the processing to be performed by a handler executes as the result of a selection made by a person after deciding how to deal with the work item 16.

Queue 56 is used for holding work items 16 that are completed, and process 58 finishes the task of completing and archiving completed work items 16. When the work item 16 has been completely responded to, as defined by the business processes defined by the composite actions, the work item 16 is placed in queue 56 for final disposal.

The described system and method allow for certain types of businesses processes to be efficiently handled in comparison with prior art systems. A trouble ticket in connection with a help desk has been described as an example, but numerous other situations are suitable for the system and method of the invention. For example, nearly any customer relationship that requires several different people to work on could use the described processes. Whenever any piece of work must be handled by different entities at different times, the described system and method can usually be defined to handle the process.

While the invention has been particularly shown and described with reference to a preferred embodiment, it will be understood by those skilled in the art that various changes in form and detail may be made therein without departing from the spirit and scope of the invention.

What is claimed is:

1. A method for handling jobs within a computer system, comprising:
   in response to a request for a job to be performed, generating a work item representing the job to be performed, the work item comprising a category, a state, a change history, and a description of the job represented by the work item, the job comprising a customer-generated request;
   placing the work item into a particular queue in a plurality of queues based at least in part on the category of the work item, each queue in the plurality of queues being for storing work items representing jobs to be performed;
   in turn, opening the work item in the particular queue in response to a request from a business process, and executing one or more tasks on the work item, each task being for resolving at least a portion of the job represented by the work item by resolving at least a portion of the customer-generated request, wherein executing a task comprises moving the work item to a queue different from its present queue; and
   after executing the one or more tasks on the work item:
   modifying the state of the work item in response to execution of the one or more tasks;
   updating the change history of the work item in response to execution of the one or more tasks;
   if the job represented by the work item is complete, archiving the work item; and
   if the job represented by the work item is not yet complete, placing the work item into one of the plurality of queues based at least in part on one or more tasks to be executed on the work item.

2. The method of claim 1, wherein executing a task comprises modifying the work item.

3. The method of claim 1, wherein executing a task comprises one or more of:
   sending an e-mail to a person; and
   sending a fax to a person.

4. The method of claim 1, wherein executing one or more tasks comprises:
   invoking one or more composite actions, each of the one or more composite actions including a rule and at least one task to be executed as a result of evaluation of the rule;
   evaluating the rule for each of the one or more composite actions; and
   executing the task corresponding to the evaluation of the rule.

5. The method of claim 1, wherein the work item further comprises an identification of a party that created the work item.

6. The method of claim 1, wherein the work item further comprises a due date for the work item indicating when the job represented by the work item should be resolved.

7. The method of claim 1, wherein the work item further comprises a current location for the work item, the current location for the work item identifying the queue in which the work item has been placed.

8. The method of claim 1, wherein the work item is a computer-implemented object.

9. The method of claim 1, wherein the business process is automated such that the business process automatically opens the work item in the particular queue.

10. The method of claim 1, wherein the work item persists until the job represented by the work item is completed.

11. The method of claim 1, wherein the state of the work item comprises one or more of:
    an open state indicating that the work item is currently opened by a business process and is currently not available to be opened by another business process; and
    a closed state indicating that the work item is waiting in its associated queue for one or more tasks to be performed on the work item by a business process.

12. The method of claim 1, further comprising providing a plurality of composite actions, each composite action comprising:
    a rule for determining an appropriate action to be performed on the work item;
    a first set of one or more actions to be performed if the rule evaluates to TRUE; and
    a second set of one or more actions to be performed if the rule evaluates to FALSE; and
    wherein executing one or more tasks on the work item comprises invoking one or more of the plurality of composite actions.

13. The method of claim 12, wherein:
    each category is associated with a composite action; and
    the method further comprises, in response to generating a work item, specifying the category of the work item based on the job represented by the work item, a rule associated with the composite action that is associated with the category of the work item determining the particular queue in which the work item should be placed.

14. The method of claim 1, wherein the job comprises a customer problem associated with a product or service, the job being completed when the customer's problem is resolved.

15. A system for handling jobs within a computer system, comprising:
one or more memory units operable to store a plurality of queues, each queue in the plurality of queues being for storing one or more work items; and
one or more processing units collectively operable to:
generate, in response to receiving a request for a job to be performed, a work item representing the job to be performed, the work item comprising a category, a state, a change history, and a description of the job represented by the work item;
place the work item into a particular queue in the plurality of queues based at least in part on the category of the work item, each queue in the plurality of queues for storing work items representing jobs to be performed;
in turn, open the work item in the particular queue in response to a request from a business process, and execute one or more tasks on the work item, each task being for resolving at least a portion of the job represented by the work item, wherein a task comprises moving the work item to a queue different from its present queue; and
after executing the one or more tasks on the work item:
modify the state of the work item in response to execution of the one or more tasks;
update the change history of the work item in response to execution of the one or more tasks;
archive the work item if the job represented by the work item is complete; and
place the work item into one of the plurality of queues based at least in part on one or more tasks to be executed on the work item if the job represented by the work item is not yet complete.

16. The system of claim 15, wherein the one or more processing units execute at least one task by invoking one or more composite actions, each composite action being stored in the one or more memory units and comprising:
a rule to be evaluated; and
at least one task to be performed executed as a result of evaluation of the rule.

17. The system of claim 16, wherein the rule evaluates to a value of true or false.

18. The system of claim 17, further comprising a set of rules to be evaluated if there is no rule to be evaluated.

19. The system of claim 15, wherein the work further comprises an identification of a party that created the work item.

20. The system of claim 15, wherein the work item further comprises a due date for the work item indicating when the job represented by the work item should be resolved.

21. The system of claim 15, wherein the work item further comprises a current location for the work item, the current location for the work item identifying the queue in which the work item has been placed.

22. The system of claim 15, wherein a task comprises modifying the work item.

23. The system of claim 15, wherein a task comprises one or more of:
sending an e-mail to a person; and
sending a fax to a person.

24. The system of claim 15, wherein the work item is a computer-implemented object.

25. The system of claim 15, wherein the business process is automated such that the business process automatically opens the work item in the particular queue.

26. The system of claim 15, wherein the work item persists until the job represented by the work item is completed.

27. The system of claim 15, wherein the state of the work item comprises one or more of:
an open state indicating that the work item is currently opened by a business process and is currently not available to be opened by another business process; and
a closed state indicating that the work item is waiting in its associated queue for one or more tasks to be performed on the work item by a business process.

28. The system of claim 15, wherein the one or more memory units store a plurality of composite actions, each composite action comprising:
a rule for determining an appropriate action to be performed on the work item;
a first set of one or more actions to be performed if the rule evaluates to TRUE; and
a second set of one or more actions to be performed if the rule evaluates to FALSE; and
wherein the one or more processing units execute one or more tasks on the work item by involving one or more of the plurality of composite actions.

29. The system of claim 28, wherein:
each category is associated with a composite action; and
the one or more processing units are further operable to, in response to generating a work item, specify the category of the work item based on the job represented by the work item, a rule associated with the composite action that is associated with the category of the work item determining the particular queue in which the work item should be placed.

30. The system of claim 15, wherein the job comprises a customer problem associated with a product or service, the job being completed when the customer's problem is resolved.

* * * * *